United States Patent
Pickford

(10) Patent No.: US 10,375,983 B2
(45) Date of Patent: *Aug. 13, 2019

(54) COATED STABILIZED MICROWAVE HEATED FOODS

(71) Applicant: Crisp Sensation Holding S.A., Geneva (CH)

(72) Inventor: Keith Graham Pickford, Manchester (GB)

(73) Assignee: Crisp Sensation Holding B.V. (NL)

( * ) Notice: Subject to any disclaimer, the term of this patent is extended or adjusted under 35 U.S.C. 154(b) by 875 days.

This patent is subject to a terminal disclaimer.

(21) Appl. No.: 14/266,611

(22) Filed: Apr. 30, 2014

(65) Prior Publication Data

US 2014/0255552 A1    Sep. 11, 2014

Related U.S. Application Data

(63) Continuation of application No. 12/764,421, filed on Apr. 21, 2010, now Pat. No. 8,765,202.

(30) Foreign Application Priority Data

Jan. 15, 2010  (GB) .................................. 1000647.6
Apr. 13, 2010  (GB) .................................. 1006097.8

(51) Int. Cl.
| | | |
|---|---|---|
| A23P 20/10 | (2016.01) | |
| A23L 29/219 | (2016.01) | |
| A23L 29/262 | (2016.01) | |
| A23L 29/281 | (2016.01) | |
| A23L 19/00 | (2016.01) | |
| A23L 13/00 | (2016.01) | |
| A23L 13/40 | (2016.01) | |
| A23L 13/50 | (2016.01) | |
| A23L 17/00 | (2016.01) | |

(52) U.S. Cl.
CPC ............. *A23P 20/105* (2016.08); *A23L 13/03* (2016.08); *A23L 13/42* (2016.08); *A23L 13/424* (2016.08); *A23L 13/426* (2016.08); *A23L 13/57* (2016.08); *A23L 17/75* (2016.08); *A23L 19/00* (2016.08); *A23L 29/219* (2016.08); *A23L 29/262* (2016.08); *A23L 29/281* (2016.08); *A23V 2002/00* (2013.01)

(58) Field of Classification Search
USPC ........................ 426/291, 292, 296, 303, 92
See application file for complete search history.

(56) References Cited

U.S. PATENT DOCUMENTS

| | | |
|---|---|---|
| 2,446,175 A | 8/1948 | Gerber |
| 3,067,921 A | 12/1962 | Reifers |
| 3,052,545 A | 9/1963 | Ducharme et al. |
| 3,208,851 A | 9/1965 | Antinori et al. |
| 3,251,531 A | 5/1966 | Hook et al. |
| 3,399,062 A | 8/1968 | Willard, Jr. et al. |
| 3,486,904 A | 12/1969 | Ziegler |
| 3,586,512 A | 6/1971 | Mancuso et al. |
| 3,597,227 A | 8/1971 | Murray et al. |
| 3,619,208 A | 11/1971 | Bahoshy et al. |
| 3,656,969 A | 4/1972 | Horn |
| RE27,531 E | 12/1972 | Murray et al. |
| 3,751,268 A | 8/1973 | van Patten et al. |
| 3,857,976 A | 12/1974 | Szymanski et al. |
| 3,899,602 A | 8/1975 | Rutenberg et al. |
| 3,904,429 A | 9/1975 | Eastman et al. |
| 3,904,601 A | 9/1975 | Tessler et al. |
| 3,915,532 A | 10/1975 | Ashton |
| 3,956,515 A | 5/1976 | Moore et al. |
| 3,969,340 A | 7/1976 | Tessler et al. |
| 3,970,767 A | 7/1976 | Tessler et al. |
| 4,020,564 A | 5/1977 | Bayliss |
| 4,068,009 A | 1/1978 | Rispoli et al. |
| 4,192,900 A | 3/1980 | Cheng |
| 4,208,442 A | 6/1980 | Evans et al. |
| 4,218,485 A | 8/1980 | Lee et al. |

(Continued)

FOREIGN PATENT DOCUMENTS

| | | |
|---|---|---|
| CA | 980164 | 12/1975 |
| DE | 2220528 | 12/1972 |

(Continued)

OTHER PUBLICATIONS

Altschul, A.M., "Low-calorie foods handbook", Georgetown University School of Medicine, Marcel Dekker, Inc., Jul. 29, 1993, pp. 1-10.

Albert, A. et al., "Adhesion in fried battered nuggets: Performance of different hydrocolloids as predusts using three cooking procedures", Food Hydrocolloids 23 (2009) 1443-1448.

(Continued)

*Primary Examiner* — Lien T Tran
(74) *Attorney, Agent, or Firm* — Nyemaster Goode, P.C.

(57) ABSTRACT

A food product comprising a substrate of pieces of meat, poultry, fish, vegetable, fruit or dairy food and an aqueous composition coating the substrate provides improved performance, particularly for microwave cooking of reheating of the food product. The aqueous coating composition includes a mixture consisting of by dry weight:

| | |
|---|---|
| cellulose gum | 15-35% |
| modified starch | 15-50% |
| hydrocolloid | 20-30%, | wherein the hydrocolloid is selected from the group consisting of xanthan gum, carrageenan gum, guar gum and mixtures thereof, and

| | |
|---|---|
| proteinaceous component | 10-20%; | wherein the percentages of the ingredients are selected from the ranges quoted to total 100%; and
wherein the aqueous coating composition does not contain any substantial amount of polydextrose.

20 Claims, No Drawings

(56) References Cited

U.S. PATENT DOCUMENTS

| | | | |
|---|---|---|---|
| 4,260,637 A | 4/1981 | Rispoli et al. |
| 4,308,286 A | 12/1981 | Anstett et al. |
| 4,342,788 A | 8/1982 | Chatfelter |
| 4,364,961 A | 12/1982 | Darley et al. |
| 4,393,088 A | 7/1983 | Matsusaka |
| 4,415,599 A | 11/1983 | Bos |
| 4,423,078 A | 12/1983 | Darley et al. |
| 4,427,706 A | 1/1984 | El-Hag |
| 4,440,793 A | 4/1984 | Seki |
| 4,568,550 A | 2/1986 | Fulger et al. |
| 4,568,555 A | 2/1986 | Spanier |
| 4,588,600 A | 5/1986 | Suderman |
| 4,597,974 A | 7/1986 | Fonteneau et al. |
| 4,609,557 A | 9/1986 | Mao et al. |
| 4,609,558 A | 9/1986 | Giacone et al. |
| 4,623,552 A | 11/1986 | Rapp |
| 4,767,637 A | 8/1988 | Ek |
| 4,778,684 A | 10/1988 | D'Amico et al. |
| 4,864,089 A | 9/1989 | Tighe et al. |
| 4,877,628 A | 10/1989 | Stypula |
| 4,913,918 A | 4/1990 | Stypula |
| 4,915,970 A | 4/1990 | Coffey |
| 4,916,831 A | 4/1990 | Yasumura et al. |
| 4,908,487 A | 5/1990 | Sarnoff et al. |
| 4,943,438 A | 7/1990 | Rosenthal |
| 4,948,608 A | 8/1990 | Stypula et al. |
| 4,978,541 A | 12/1990 | Stypula et al. |
| 5,049,711 A | 9/1991 | August |
| 5,057,329 A | 10/1991 | Stypula et al. |
| 5,088,179 A | 2/1992 | Gibbon |
| 5,093,176 A | 3/1992 | Pribonic et al. |
| 5,175,010 A | 12/1992 | Roig et al. |
| 5,202,138 A | 4/1993 | Stypula et al. |
| H1229 H | 9/1993 | McGinley et al. |
| 5,266,340 A | 11/1993 | Samson et al. |
| 5,281,432 A | 1/1994 | Zallie et al. |
| 5,308,636 A | 5/1994 | Tye et al. |
| 5,310,977 A | 5/1994 | Stenkamp et al. |
| 5,310,980 A | 5/1994 | Beckett et al. |
| 5,321,900 A | 6/1994 | Meyer |
| 5,350,585 A | 9/1994 | Sunderland |
| 5,423,477 A | 6/1995 | Valdman et al. |
| 5,431,944 A | 7/1995 | Melvej |
| 5,433,966 A | 7/1995 | Wolt et al. |
| 5,492,707 A | 2/1996 | Chalupa et al. |
| 5,523,102 A | 6/1996 | Morasch |
| 5,565,132 A | 10/1996 | Sayler |
| 5,601,861 A | 2/1997 | Gerrisch et al. |
| 5,736,178 A | 4/1998 | Cook et al. |
| 6,097,017 A | 8/2000 | Pickford |
| 6,214,403 B1 | 4/2001 | Broberg et al. |
| 6,261,625 B1 | 7/2001 | Pickford |
| 6,287,621 B1 | 9/2001 | Lacourse et al. |
| 6,288,179 B1 | 9/2001 | Baur et al. |
| 6,326,599 B1 | 12/2001 | Pickford |
| 6,399,130 B2 | 6/2002 | Parker |
| 6,413,562 B2 | 7/2002 | Conforti et al. |
| 6,458,404 B1 | 10/2002 | Adachi |
| 6,503,546 B1 | 1/2003 | Ferrari-Philippe et al. |
| 6,613,370 B1 | 9/2003 | Pickford |
| 6,620,447 B1 | 9/2003 | Paukkunen et al. |
| 7,147,885 B2 | 12/2006 | Asano et al. |
| 2001/0014363 A1 | 8/2001 | Parker |
| 2001/0024672 A1 | 9/2001 | Kondou et al. |
| 2001/0055641 A1 | 12/2001 | Conforti et al. |
| 2002/0039615 A1 | 4/2002 | Adachi |
| 2002/0119226 A1 | 8/2002 | Conforti et al. |
| 2002/0192332 A1 | 12/2002 | Pickford |
| 2003/0147998 A1 | 8/2003 | Geng et al. |
| 2003/0198711 A1 | 10/2003 | Pickford |
| 2004/0213883 A1 | 10/2004 | Sadek et al. |
| 2005/0169099 A1 | 8/2005 | Sprinkle |
| 2006/0053650 A1 | 3/2006 | Manack et al. |
| 2006/0286240 A1 | 12/2006 | Roosjen |
| 2011/0091612 A1 | 4/2011 | Pickford |
| 2011/0177200 A1 | 7/2011 | Pickford |
| 2011/0177210 A1 | 7/2011 | Pickford |
| 2011/0177211 A1 | 7/2011 | Pickford |
| 2012/0196004 A1 | 8/2012 | Pickford |
| 2012/0196005 A1 | 8/2012 | Pickford |
| 2012/0288592 A1 | 11/2012 | Pickford |
| 2013/0156925 A1 | 6/2013 | Pickford |

FOREIGN PATENT DOCUMENTS

| | | |
|---|---|---|
| DE | 2338180 | 2/1975 |
| EP | 17338 | 10/1980 |
| EP | 109226 | 5/1984 |
| EP | 155760 | 9/1985 |
| EP | 327332 | 8/1989 |
| EP | 344726 | 12/1989 |
| EP | 392119 | 10/1990 |
| EP | 510320 | 2/1992 |
| EP | 273475 | 3/1992 |
| EP | 648433 | 10/1994 |
| EP | 1929887 | 6/2008 |
| EP | 2207434 | 8/2011 |
| EP | 2359697 | 8/2011 |
| EP | 2374361 | 10/2011 |
| EP | 2481294 | 8/2012 |
| EP | 2481295 | 8/2012 |
| FR | 2337534 | 8/1977 |
| FR | 2343668 | 10/1997 |
| GB | 1419455 | 12/1975 |
| GB | 2226220 | 11/1988 |
| JP | 57-159451 | 10/1982 |
| JP | 01-168242 | 7/1989 |
| WO | 85/01188 | 3/1985 |
| WO | 88/06007 | 8/1988 |
| WO | 88/06847 | 9/1988 |
| WO | 89/08549 | 9/1989 |
| WO | 92/01384 | 2/1992 |
| WO | 93/03634 | 3/1993 |
| WO | 93/06752 | 4/1993 |
| WO | 93/14995 | 8/1993 |
| WO | 94/13160 | 6/1994 |
| WO | 94/19917 | 9/1994 |
| WO | 94/27887 | 12/1994 |
| WO | 95/07629 | 3/1995 |
| WO | 95/23523 | 9/1995 |
| WO | 95/24110 | 9/1995 |
| WO | 95/30344 | 11/1995 |
| WO | 96/02149 | 2/1996 |
| WO | 96/22228 | 7/1996 |
| WO | 96/32026 | 10/1996 |
| WO | 96/38054 | 12/1996 |
| WO | 97/03572 | 2/1997 |
| WO | 97/29653 | 8/1997 |
| WO | 98/08399 | 3/1998 |
| WO | 99/44439 | 9/1999 |
| WO | 2005/112664 | 12/2005 |
| WO | 2006/030333 | 3/2006 |
| WO | 2006/082804 | 8/2006 |
| WO | 2008/078997 | 7/2008 |
| WO | 2010/001101 | 1/2010 |

OTHER PUBLICATIONS

Henderson, A., "Cellulose ethers—the role of thermal gelation", Dow Chemical Europe, CH-8810 Horgen, Switzerland, 1988, pp. 265-275.

WO application No. PCT/GB96/01685, International Search Report dated Oct. 29, 1996.

WO application No. PCT/GB97/00924, International Search Report dated Jul. 30, 1997.

WO application No. PCT/GB99,00564, International Search Report dated Jun. 29, 1999.

WO application No. PCT/GB92/01559, International Search Report dated Dec. 30, 1992.

WO application No. PCT/GB95/00958, International Search Report dated Aug. 22, 1995.

(56) References Cited

OTHER PUBLICATIONS

WO Patent application No. PCT/GB2011/050060, International Search Report and Written Opinion dated May 23, 2011.
WO patent application No. PCT/GB2011/050057, International Search Report dated May 23, 2011.
WO patent application No. PCT/GB2011/050055, International Search Report and Written Opinion dated May 20, 2011.
U.S. Appl. No. 09/000,319, Office Action dated Feb. 3, 1999.
U.S. Appl. No. 09/000,319, Office Action dated Mar. 27, 2000.
U.S. Appl. No. 09/381,848, Office Action dated Sep. 26, 2000.
U.S. Appl. No. 09/381,848, Office Action dated May 8, 2001.
U.S. Appl. No. 09/646,068, Office Action dated May 8, 2002.
U.S. Appl. No. 09/646,068, Office Action dated Feb. 4, 2003.
EP patent application No. 11152421.1, Extended Search Report dated Jul. 5, 2011.
EP patent application No. 11152415.3, Extended Search Report dated Jul. 5, 2011.
U.S. Appl. No. 12/764,428, Office Action dated Jan. 5, 2012.
U.S. Appl. No. 12/764,428, Office Action dated Jun. 21, 2012.
U.S. Appl. No. 12/764,407, Office Action dated Oct. 5, 2012.
U.S. Appl. No. 12/764,421, Office Action dated Oct. 9, 2012.
U.S. Appl. No. 13/015,486, Office Action dated Oct. 12, 2012.
FoodSafety.gov, "Minimum Cooking Temperatures," downloaded from http://www.foodsafety.gov/keep/charts/mintemp.html on Sep. 30, 2012.
Kuntz, Lynn A., "The Great Cover-Up: Batters, Breadings & Coatings," downloaded from http://www.foodproductdesign.com on Sep. 28, 2012.
U.S. Appl. No. 13/015,491, Office Action dated Oct. 15, 2012.
WO patent application No. PCT/GB2009/001617, Search Report and Written Opinion dated Jul. 1, 2008.
EP patent application No. 09772781.2, Communication under Rule 71(3) EPC, intent to grant, dated Mar. 14, 2011.
U.S. Appl. No. 13/331,900, Office Action dated Dec. 7, 2012.
Clextral Press Release: New drying technology provides optimal drying for complex products and reduces energy expense, Clextral—a division of Groupe Legris Industries, Jun. 2009.
Clextral Rotante Evolum dryer—new generation for sustainable development, Clextral—a division of Groupe Legris Industries, Jun. 2009.
EP patent application No. 1119483.6, Extended European Search Report dated Aug. 10, 2012.
Perten, Harald, "Application of the falling number method for evaluating alpha-amylase activity," Cereal Chemistry, vol. 41, May 1964, pp. 127-140.
English translation of Paris GDS Moulins FR 2,458,227, Jan. 1981.
Edwards, W.P., "The Science of Bakery Products," Chapter 7—Raw Materials, the Royal Society of Chemistry, 2007.
English translation of Wiedmann et al., EP 0510320A1, Oct. 1992, downloaded from http://translationportal.epo.org on Jan. 25, 2013.
"Criteria for Judging Quality," published Jun. 20, 2008, downloaded from http://web.archive.org/web/20080620034754http://www.theartisan.net/flour_criteria_judging.htm on Jan. 25, 2013.
English translation of RU 2277438, Rye-wheat bread and its proI3vodstva, Berestnev et al., Jun. 10, 2006.
U.S. Appl. No. 13/015,486, Office Action dated Feb. 19, 2013.
U.S. Appl. No. 12/764,428, Office Action dated Mar. 22, 2013.
U.S. Appl. No. 12/764,421, Office Action dated Apr. 1, 2013.
U.S. Appl. No. 12/764,407, Office Action dated Apr. 5, 2013.
U.S. Appl. No. 13/331,900, Office Action dated Apr. 10, 2013.
EP patent application No. 12178463, European Search Report dated Jan. 22, 2013.
WO patent application No. PCT/EP2012/076015, International Search Report and Written Opinion dated May 7, 2013.
U.S. Appl. No. 13/015,491, Office Action dated Jun. 5, 2013.
U.S. Appl. No. 13/107,814, Office Action dated Jun. 21, 2013.
U.S. Appl. No. 12/669,953, Notice of Allowance dated Jul. 25, 2013.
EP patent application No. 11163536.3, Communication under Rule 71(3) EPC, Intent to Grant, dated May 30, 2013.
U.S. Appl. No. 14/032,881, "Microwaveable Batter," Keith Graham Pickford, filed Sep. 20, 2013.
U.S. Appl. No. 12/764,407, Office Action dated Oct. 25, 2013.
U.S. Appl. No. 13/015,491, Office Action dated Nov. 8, 2013.
U.S. Appl. No. 14/105,847, "Stabilized Cheese Products," van der Kolk et al., filed Dec. 13, 2013.
U.S. Appl. No. 13/015,486, Office Action dated Jan. 6, 2014.
U.S. Appl. No. 12/764,407, Notice of Allowance dated Feb. 12, 2014.
U.S. Appl. No. 13/107,814, Office Action dated Feb. 13, 2014.
U.S. Appl. No. 14/170,371, "Microwaveable Batter," Wilhelmus Johannes Gerardus Michiels et al., filed Jan. 31, 2014.
U.S. Appl. No. 14/029,681, Office Action dated Apr. 2, 2014.
U.S. Appl. No. 12/764,421, Notice of Allowance dated Apr. 11, 2014.
U.S. Appl. No. 14/249,250, "Stabilisation of microwave heated food substrates," Keith Graham Pickford, filed Apr. 9, 2014.

COATED STABILIZED MICROWAVE HEATED FOODS

CROSS REFERENCE TO RELATED APPLICATION

This application is a continuation of U.S. patent application Ser. No. 12/764,421, filed Apr. 21, 2010 Now U.S. Pat. No. 8,728,554, titled COATED STABILISED MICROWAVE HEATED FOODS, now pending, which is incorporated herein by reference in its entirety and for all purposes.

BACKGROUND OF THE INVENTION

This invention relates to food products which can be cooked or reheated using a microwave oven. The invention relates particularly but not exclusively to foodstuffs comprising a core and a coating surrounding the core, for example a battered or breaded product. The invention also relates to non-coated food products and to ingredients for food products. This invention also includes products which may be cooked or reheated in a conventional thermal oven, grill or shallow or deep fried.

Many food materials, for example natural muscle of poultry, fish or red meat or vegetable or processed foods contain a large percentage of water. Most fresh foods contain more than 60% water. Some of this water is bound, that is tightly attached to the constituent cells. The remaining mobile water is available and can be frozen. If a food product is frozen to a core temperature of between −1° C. and −30° C. or lower and is placed and irradiated in a microwave oven, the microwave energy will be primarily absorbed by the frozen available water. Whereas in conventional cooking heat is applied from the exterior, in microwave cooking heat is generated from within. The process of heating can be very rapid so that available water is converted into steam. When a food product is allowed to stand after heating in a microwave oven, water can continue to be expelled from the product. This is particularly noticeable for example when heating frozen fish muscle. The loss of water causes any food coating, particularly a batter, pastry or breadcrumb coating to become soggy and unpalatable. In addition the core of the substrate may become dry due to the loss of water.

Attempts have been made to limit the escape of moisture during microwave cooking by coating the product with a composition which forms an impermeable film. This is unsatisfactory because the natural distribution of water within the coated product is lost through any coating as steam and due to internal pressure. Furthermore an impenetrable coating or film is detrimental to the taste and mouth feel of the product.

WO97/03572 discloses a method of stabilising a microwave cookable or reheatable food material by impregnation of the product with a stabiliser composition comprising cellulose gum, modified starch, polydextrose, xanthan gum, egg albumen and pea starch.

DETAILED DESCRIPTION OF THE INVENTION

According to a first aspect of the present invention there is provided a method of manufacture of a microwave or thermally cookable or reheatable food product wherein the product comprises a substrate comprising pieces of poultry, red meat, fish or vegetable, fruit or, dairy foods; the method comprising the steps of a mixture comprising:

applying a first coating of an aqueous coating to the substrate;

wherein the aqueous coating comprises water and about 0.1 to about 5% by dry weight of:

| cellulose gum | 15-35% |
|---|---|
| modified starch | 15-50% |
| hydrocolloid | 20-30% |
| proteinaceous component | 10-20% | wherein the percentages of the ingredients are selected from the ranges quoted to total 100%; and optional further ingredients;

applying a first crumb coating of fine crumb to the aqueous coating to form a layer of fine crumb encasing the substrate;

applying a batter composition to the first crumb coating to form a batter coating;

and optionally applying a second crumb coating of outer crumb to the batter coating.

The amount of modified starch in the stabiliser composition is preferably from about 15% to about 40%, more preferably from about 15% to about 40%, more preferably from about 15% to about 35%.

The method of the present invention confers the advantage that coating of pieces of meat, poultry or fish with a pre-dust before applying a batter composition is avoided. Use of a pre-dust has the disadvantage that the pre-dust powder is transferred to the batter composition during the course of a manufacturing process leading to an increase in viscosity and a change in the chemical composition of the batter. Also, the pre-dust can become airborne leading to contamination of adjacent equipment and a potential hazard. This is particularly disadvantageous in large scale industrial production. The invention finds particular application in commercial scale production of food products, for example, having a throughput of more than 50 kg/hr, for example more than 100 kg/hr, preferably more than 500 kg/hr.

The protein containing component may comprise ingredients selected from the group consisting of: egg albumen, protein isolate and mixtures thereof. A suitable protein isolate is soya protein isolate. Use of egg albumen is preferred.

Preferably the substrate is impregnated with a stabiliser composition before coating with the aqueous coating solution. Use of a stabiliser is especially preferred for microwave cookable or reheatable products.

For thermally cookable or reheatable food products the step of impregnation of the substrate with the stabiliser may be omitted.

The stabiliser may comprise a stabiliser composition as described below or may be as disclosed in WO97/03572, particularly Examples 8 or 9.

In a preferred aspect of the invention the stabiliser composition comprises an aqueous solution of:

| cellulose gum | 5-25% |
|---|---|
| modified starch | 16-50% |
| thickener component | 32-79% | wherein the percentages of the ingredients are by dry weight and are selected from the ranges quoted to total 100%.

The amount of modified starch in the stabiliser composition is preferably from about 16% to about 45%, more preferably from about 16% to about 40%, especially from about 16% to about 35% by dry weight.

Preferably the thickener component comprises as percentages of the stabiliser composition by dry weight:

| polydextrose | 30-55% |
|---|---|
| proteinaceous component | 1-20% |
| hydrocolloid | 1-10% |

The proteinaceous component may comprise ingredients selected from the group consisting of: egg albumen, whey protein, protein isolate and mixtures thereof. A suitable protein isolate is soya protein isolate. Use of egg albumen is preferred.

Suitable hydrocolloids may be selected from the group consisting of xanthan gum, carageenan gum, guar gum and mixtures thereof. Use of xanthan gum, guar gum or mixtures thereof is particularly preferred Use of xanthan gum or a mixture of hydrocolloids containing xanthan gum is especially preferred. An amount of about 3% to about 10%, particularly about 6% is preferred.

The cellulose gum and modified starch may be considered to act as a thermal gelation component. The thickener component may serve as a binder. Without wishing to be bound by theory it is believed that the gelation component may serve to form a thermal gel during heating preventing loss of water from the substrate. The thickener component may serve as a thickener and binder and may also serve as a cryoprotectant so that the overall stabiliser composition retains water in the substrate matrix during cooking or reheating in a microwave oven and so that the product has improved storage properties when frozen.

In a preferred embodiment the stabiliser composition comprises an aqueous solution of:

| cellulose gum | 5-25% |
|---|---|
| modified starch | 16-35% |
| polydextrose | 30-55% |
| hydrocolloid | 1-10% |
| egg albumen | 1-20% | wherein the percentages of the ingredients are by dry weight and are selected from the ranges quoted to total 100%.

A particularly preferred stabiliser composition comprises:

| cellulose gum | 10-20% |
|---|---|
| modified starch | 20-30% |
| polydextrose | 35-45% |
| hydrocolloid | 3-10% |
| egg albumen | 3-18% |

The preferred hydrocolloid is xanthan gum or a mixture of hydrocolloids containing xanthan gum.

An especially preferred stabiliser composition comprises:

| cellulose gum | 15% |
|---|---|
| modified starch | 24% |
| polydextrose | 40% |
| xanthan gum | 6% |
| egg albumen | 15% |
| Total | 100% |

Preferably the aqueous coating composition comprises water and 0.1 to 5% by dry weight of:

| cellulose gum | 15-35% |
|---|---|
| modified starch | 15-35% |
| hydrocolloid | 20-30% |
| egg albumen | 10-20% | wherein the percentages of the ingredients are by dry weight and are selected from the ranges quoted to total 100%.

The aqueous coating may be a viscous aqueous solution, may be thixotropic, or may be a gel which forms a solid or semi-solid consistency when not subjected to shear. The aqueous coating is preferably a free flowing viscous fluid or gel and may be referred in this specification as a "gel" or "aqueous coating" for convenience.

The preferred hydrocolloid in the aqueous coating composition is xanthan gum or a mixture of hydrocolloids containing xanthan gum.

The aqueous coating composition is preferably dissolved or dispersed in water to form a viscous solution or gel with a solids content of about 0.1% to 5%, preferably about 0.3% to 3%, more preferably about 1%.

The aqueous stabiliser is preferably dissolved or dispersed in water to give a solution with a solids content of about 0.1% to about 20%, preferably 1% to about 8%, more preferably about 3% to about 5%.

Preferred cellulose gums may be selected from the group consisting of: methyl cellulose, hydroxypropyl methyl cellulose and carboxymethyl cellulose. Methyl cellulose or cellulose ethers particularly as sold under the trade mark METHOCEL A4M is especially preferred. An amount of about 10%, preferably about 15% is particularly preferred.

Preferred modified starches comprise partially degraded starch which has been modified for example by heating or acetylation. Hydroxyalkylated starch for example hydroxypropylated starch may be employed. A suitable modified starch is manufactured under the trade mark THERMFLO. An amount of about 20% to about 30%, preferably about 24% is preferred.

Suitable hydrocolloids for use in the gel composition may be selected from the group consisting of: xanthan gum, carageenan gum, guar gum and mixtures thereof. Use of xanthan gum, guar gum or mixtures thereof is particularly preferred Use of xanthan gum or a mixture of hydrocolloids containing xanthan gum is especially preferred. An amount of about 5%, particularly about 6% is preferred.

Polydextrose as employed in this invention is available under the trade mark LITESSE. An amount of about 30% to about 55%, preferably about 55% to about 45% more preferably about 40% may be used.

In a preferred embodiment the stabiliser composition contains polydextrose and the coating composition does not contain any or a substantial amount of polydextrose.

The proteinaceous component may comprise ingredients selected from the group consisting of: egg albumen, whey protein, protein isolate and mixtures thereof. A suitable protein isolate is soya protein isolate. Use of egg albumen is preferred.

Further ingredients may be used as necessary. For example flavourings, preservatives or colourants may be added.

Preferred stabiliser or aqueous coating compositions do not contain substantial amounts of other starches. In particularly preferred embodiments one or both of the stabiliser and aqueous coating compositions consist essentially of the disclosed ingredients, that, is no further ingredients are present in sufficient amounts to alter the essential properties of the composition. More preferably there are no further ingredients in the stabiliser and aqueous coating compositions.

According to a second aspect of this invention a microwave or thermally cookable or reheatable food product comprises a substrate comprising pieces of poultry, fish, red meat, vegetable, dairy or processed foods;

a coating of an aqueous coating applied to the substrate;

wherein the aqueous coating comprises water and 0.1 to 5% by dry weight of:

|  |  |
| --- | --- |
| cellulose gum | 15-35% |
| modified starch | 15-35% |
| hydrocolloid | 20-30% |
| proteinaceous component | 10-20% | a first coating of fine crumb applied to the aqueous solution coating to form a layer of fine crumb encasing the substrate;

a batter composition applied to the first coating to form a batter coating;

an optional layer of outer crumb applied to the batter coating.

The proteinaceous component may comprise ingredients selected from the group consisting of: egg albumen, whey protein, protein isolate and mixtures thereof. A suitable protein isolate is soya protein isolate. Use of egg albumen is preferred.

Preferably the substrate is impregnated with a stabiliser composition before coating with the aqueous coating. Use of a stabiliser is especially preferred for microwaveable products.

For thermally cookable or reheatable food products the step of impregnation of the substrate with the stabiliser may be omitted.

The stabiliser may comprise a composition as described above with reference to the first and second aspects of the invention or may be as disclosed in WO97/03572.

Preferably the aqueous coating comprises water and 0.1-5% by dry weight of:

|  |  |
| --- | --- |
| cellulose gum | 15-35% |
| modified starch | 15-35% |
| hydrocolloid | 20-30% |
| egg albumen | 10-20% |

A particularly preferred aqueous coating composition comprises:

|  |  |
| --- | --- |
| cellulose gum | 20-30% |
| modified starch | 20-40% |
| hydrocolloid | 20-40% |
| egg albumen | 10-30% |

An especially preferred aqueous coating composition comprises:

|  |  |
| --- | --- |
| cellulose gum | 25% |
| modified starch | 35% |
| xanthan gum | 25% |
| egg albumen | 15% |
| Total | 100% |

In a particularly preferred embodiments of the invention a first coating of fine crumb is applied to the aqueous coating solution.

Advantageously the fine crumb has a particle size of about 0.1 to about 1 mm, preferably about 0.25 to about 0.9 mm. Smaller particles for example crumb dust may be used. A 1 mm mesh sieve may be used to screen larger particles from the fines. The fine crumb may comprise fines resultant from milling during manufacture of crumb used for the exterior coating of a food product.

Untreated fines may be used, for example pin head rusk. However use of pin head rusk may not be preferred for certain applications due to a tendency to form a moist or slimy coating caused by picking up of water from contact with the aqueous coating or gel or from a batter composition applied to the fine crumb layer.

Preferably crumb fines incorporating a hydrocolloid may be employed. The hydrocolloid may be selected from guar gum, xanthan gum or mixtures thereof. Use of a hydrocolloid may provide a degree of water resistance to the fines reducing any tendency to pick up moisture from adjacent gel or batter layers. Use of fines resulting from the process for manufacture of crumb as disclosed in WO 2010/001101 is especially preferred.

Application of a first coating of crumb fines may be difficult without use of an aqueous coating or gel applied as a pre-coat as disclosed above since the fines will not adhere sufficiently to a dry substrate such as a conventional pre-dust. Use of the aqueous coating or gel coating has the additional advantage that the fines layer may adhere to the substrate providing a complete covering or shell surrounding the stabilised substrate to reduce the escape of water vapour or ingress of fat during frying. Application of the aqueous coating or gel allows formation of a complete coating on the substrate allowing adhesion of the first fine crumb to the entire surface forming an integral shell of the fine crumb.

The first crumb coating may be applied using a first crumb applicator, the crumb being applied in excess with the surplus being shaken off.

A loading of the crumb layer may be about 5-10% of the weight of the stabilised substrate, dependent on the size of the substrate particles and other factors.

Following application of the first crumb, a coating of batter may be applied by immersion using a tempura applicator or other convenient apparatus. Following application of the batter layer a second outer crumb coating may be applied. Preferably two outer coatings of crumb are applied, the first coating being of larger particles followed by a further coating of smaller particles to fill any gaps between the larger particles.

In a preferred embodiment the first outer crumb coating comprises particles having a size of 1-3 mm preferably about 2 mm or larger as appropriate. The crumb may be applied in excess using a crumb applicator with surplus shaken off. The crumb coated substrate may be passed through a roller to improve adhesion.

A second outer coating of smaller particles of crumb for example having a size from about 0.2 to about 2 mm and preferably about 0.5 to about 1 mm may be applied dependent on the size of the substrate and the dimensions of the first outer crumb. Use of two crumb layers forms an integral coating without the batter layer being visible. A roller may be used to improve adhesion of the second crumb coating.

This invention also provides a dry composition for hydration to form a stabiliser or an aqueous coating in accordance with previous aspects of this invention.

A method of stabilisation and stabiliser compositions in accordance with this invention may be used for coated products such as crumbed or pastry enrobed products. In addition the composition may be used for uncoated products including cooked meat, for example sausages and fish. Vegetables and fruit may also be stabilised.

The method may include the step of applying a second or further batter coating to the impregnated coated substrate.

A batter coating may be applied to the substrate. A suitable batter coating is disclosed in our UK patent application No 1000647.6 filed 15 Jan. 2010, the disclosure of which is incorporated into the specification by reference for all purposes. Alternatively a coating as disclosed in WO96/32026 may be used.

A crumb coating may be applied to the batter coating. A preferred crumb coating is disclosed in WO 2010/001101, the disclosure of which is incorporated in to the present specification for all purposes by reference.

The battered and/or crumb coated product may be fried and then frozen for storage prior to use.

The coated product, whether frozen, chilled or fresh, may be reheated or cooked before use using an oven selected from: a microwave oven, a conventional oven or grill, shallow or deep fry, or an oven using a combination of microwave and conventional heating.

The pieces of the substrate may be whole portions, for example whole muscle portions such as individual steaks or fillets or larger pieces which may be cut into individual portions after cooking or reheating. Alternatively the pieces may comprise chopped or comminuted pieces, for example, nuggets or minced products which may be reformulated into larger portions.

The substrate may be impregnated with the stabiliser composition by vacuum impregnation, soaking or injection.

Stabiliser compositions in accordance with this invention can confer several advantages. Application of a predust is avoided, preventing problems arising from dispersion of dust in the manufacturing environment. Furthermore the transmission of dust into a batter composition used in a subsequent coating step is avoided, preventing an increase in viscosity of the batter during use. The aqueous coating or gel coating exhibits good adhesion to the impregnated substrate. Adhesion of subsequently applied crumb or other fine particles is facilitated. The aqueous coating or gel coating also serves as an additional barrier to loss of moisture from the substrate during the subsequent microwave heating stage. Without wishing to be bound by theory it is believed that the gel coating composition adsorbs moisture escaping from the core and also serves as a barrier to fat pickup by the core, avoiding impairment of the flavour of the core. Impregnation of the core with an aqueous solution of the stabiliser contributes to the moisture content of the core during cooking or reheating.

Amounts and percentages referred to in this specification are by weight unless indicated otherwise and are selected from any ranges quoted to total 100%.

The invention is further described by means of example but not in any limitative sense.

EXAMPLE 1

Stabiliser Composition

A stabiliser composition was prepared using the following ingredients:

| Ingredient | % |
| --- | --- |
| cellulose gum (Methocel A4M) | 15.0 |
| modified starch (Thermflo) | 24.0 |
| polydextrose | 40.0 |
| xanthan gum | 6.0 |
| egg albumen | 15.0 |
| Total | 100.0 |

EXAMPLE 2

General-Purpose Stabiliser Composition

A composition of the following ingredients was used to form a viscous fluid coating composition

| | |
| --- | --- |
| Methylcellulose | 15% |
| modified starch (Thermflo) | 24% |
| egg albumen | 15% |
| xanthan gum | 6% |
| polydextrose | 40% |
| | 100% |

The composition was dissolved in water to produce a solution with a concentration suitable to stabilise the particular substrate in use. This general purpose formula may be modified to increase its efficiency in specific substrates. The above formula may be modified by addition of citric acid (up to 1%) and ascorbic acid (up to 2%) with the polydextrose (Litesse II (Trade Mark)) being reduced accordingly.

EXAMPLE 3

Preparation of Stabiliser Composition

The dry powder mixture was partially hydrated in a tub and then poured into a bowl chopper. The bowl chopper was then run for two to three minutes until fully hydrated. The mixture can be hydrated directly in the bowl chopper if required. Alternatively, the stabiliser may be hydrated using a high shear mixer fitted with a general purpose head.

EXAMPLE 4

Impregnation of the Substrate with the Stabiliser Composition

A chicken mixture for chicken dippers or nuggets was prepared with the following composition which was prepared as a dry mixture, as an alternative to use of a hydrated stabiliser composition. The stabiliser of Example 1 was used.

| | |
| --- | --- |
| chicken emulsion | 20% |
| skin - 3 mm | 18% |
| chicken breast - 10 mm | 50% |

| | |
|---|---|
| water | 2% |
| rusk | 2% |
| stabiliser (Example 1) | 5% |
| seasoning | 3% |
| | 100% |

The chicken breast was chilled to −3° C. and minced using a 10 mm plate. After mincing, the temperature was 0-3° C. Water was added with mixing. A chicken emulsion comprising the following ingredients was added with mixing:

| | |
|---|---|
| chicken skin | 44% |
| water | 44% |
| soya isolate | 11% |
| salt | 1% |
| | 100% |

The stabiliser in accordance to Example 1 was added and mixed thoroughly. Rusk was added with mixing following by seasoning. A dry powder flavouring was preferred. The composition was allowed to dissolve in use in water which was present in the substrate in order to form an aqueous stabiliser solution in situ.

A vacuum was applied to the mixture to consolidate the structure following which the chicken mixture was chilled to −3° C. and formed into shaped pieces.

A similar procedure was used for other comminuted meat products. Large particulate cores may be manufactured using a similar method.

EXAMPLE 5

Impregnation of a Chicken Mixture with the Stabiliser Composition

| Composition | |
|---|---|
| chicken breast meat (13 mm) | 79% |
| salt | 1% |
| water | 12% |
| stabiliser (Example 1) | 5% |
| inuline and seasoning | 3% |
| | 100% |

EXAMPLE 6

Impregnation of a Fish Mixture with a Stabiliser Composition

| | |
|---|---|
| cod fillet blocks (partially thawed) | 85.8% |
| salt | 0.9% |
| water | 4.6% |
| stabiliser (Example 1) | 4.8% |
| fish binder | 3.9% |
| | 100% |

EXAMPLE 7

Batter Coating Composition

A batter coating composition was prepared by mixing the following ingredients:

| Ingredient | % |
|---|---|
| soya flour (Hisoy) | 29.0 |
| high amylase starch (Hylon 7) | 28.8 |
| maize flour | 19.2 |
| whole egg (Henningsen W1) | 14.0 |
| glyceryl monostearate | 02.0 |
| D-xylose | 02.0 |
| monosodium phosphate | 1.90 |
| guar gum | 1.0 |
| ammonium bicarbonate | 0.7 |
| glucono-D-lactone | 0.7 |
| sodium acid pyrophosphate | 0.4 |
| thickener (Methocel A4M) | 0.2 |
| alpha amylase | 0.1 |
| | 100% |

The batter can be mixed in batches using a Silverson DX high shear mixer on a gantry with a slotted disintegrating head. Batches were mixed in the ratio of 25 kilos water to 12.5 kilos dry batter powder in a vat with a diameter of 68 cm. Thereafter, the mix was diluted as required for example to give a ratio of water: powder of 2.4:1.

In full scale production the batter ingredients were mixed in a ratio of water: powder of 2.4:1 using two 200 litre stainless steel vessels linked by a pump and an inline Silverson mixer with a high shear slotted disintegrating head. One tank was fitted with a paddle and was filled with water at 15-20° C. The dry ingredients were added to the water and wetted by rotation of the paddle. The second tank was fitted with a cooling jacket and a return pipe to the first vessel. The batter mixture was circulated through the high shear head until a temperature of 42° C. was reached by mechanical heat transfer. The start temperature of the water may be increased to reduce mixing time. When 42° C. was reached, the mixing and enzymolysis were complete. The batter was transferred to the second vessel and cooled. A heat exchanger may be used to cool the mixture. After cooling, the batter was pumped into a tempura type batter applicator.

The viscosity in the batter mixture was in the range 550-650 cP as measured by a number 3 spindle at 60 rpm. The batter was found to give a good rate of pickup and a crisp coating after frying.

EXAMPLE 8

Aqueous Coating Composition

The following mixture was prepared:

| | |
|---|---|
| modified starch (Thermflo) | 35% |
| thickener (Methocel A4M) | 25% |
| xanthan gum | 25% |
| egg albumen | 15% |
| | 100% |

The mixture was dissolved in water to form a 1% solution using a CFS Scanbrine mixer with paddle agitation. The solution was left to stand for 24 hours to form a fully hydrated gel or viscous aqueous solution The aqueous coating was applied to impregnated substrates of Examples 4 to 7 using a tempura type batter applicator in which the substrate particles were dipped.

A pump is necessary to run the machine but after a short while bubbles form in the solution or gel in the applicator. To prevent this problem food grade anti foaming agents can be used. Polydimethylsiloxane is preferred but calcium alginate, methyl ethyl cellulose, methylphenylpolysiloxane or polyethylene glycol can be used.

EXAMPLE 9

Crumb Application

A crumb was prepared as disclosed in WO 2010/001101, the disclosure of which is incorporated herein by reference for all purposes.

Following application of the aqueous coating as described in Example 8, a fine crumb was applied with a mesh size less than 1 mm or such as may be described as a dust, using a CFS Crumbmaster breadcrumb applicator.

The fine crumb coated impregnated substrate was passed through the batter of Example 7 in a tempura batter applicator.

A 2 mm crumb was applied in a second CFS Crumbmaster breadcrumb applicator with slight pressure from a roller. Particles were passed through a third CFS Crumbmaster breadcrumb applicator to infill with a 1 mm crumb using light pressure from a roller.

EXAMPLE 10

Frying and Cooking

The coated substrate of Example 9 was fried in pure, fresh rapeseed oil for 2 minutes 20 seconds approximately at 180-188° C. The frying time can be varied depending upon the weight and size of the particles. After frying, the core temperature was 74-85° C. A small loss of weight was observed due to loss of water from the substrate but this is mostly compensated for by the uptake of oil.

The invention claimed is:

1. A food product comprising:
a food substrate impregnated with a stabilizer composition and having an exterior surface and wherein the food substrate is coated with an aqueous coating composition that is a different composition from the stabilizer composition a first dry crumb on the aqueous coating composition and forming a first dry crumb coating; and wherein the aqueous coating composition forms a coating on the exterior surface of the substrate, the aqueous coating composition comprising water and a mixture of ingredients comprising, by dry weight of the mixture:

| | |
|---|---|
| a cellulose gum | 15-35% |
| modified starch | 15-50% |
| hydrocolloid | 20-30%, |
| proteinaceous component | 10-20%; | wherein the hydrocolloid is selected from the group consisting of xanthan gum, carrageenan gum, guar gum and mixtures thereof, and and
wherein the percentages of the ingredients are selected from the ranges quoted to total 100%.

2. The food product of claim 1, wherein the proteinaceous component of the aqueous coating composition is selected from the group consisting of egg albumen, whey protein, protein isolate and mixtures thereof and the aqueous coating composition is free of polydextrose.

3. The food product of claim 2, wherein the proteinaceous component of the aqueous coating composition is egg albumen and wherein the first dry crumb has a particle size such that the first dry crumb will pass through a 1 mm mesh sieve is applied to the aqueous coating composition.

4. The food product of claim 1, wherein the aqueous coating composition is a thixotropic gel and wherein the substrate is a meat, a poultry, a fish, a vegetable, a fruit or a dairy food.

5. The food product of claim 1, wherein the food substrate has been impregnated with a stabilizer composition comprising polydextrose in an amount of from 30% to 55% by weight of the stabilizer composition, but is subsequently coated with an aqueous coating composition that is a different composition from the stabilizer composition employed to stabilize the substrate and wherein the aqueous coating composition does not contain a substantial amount of polydextrose and wherein the substrate is a meat, a poultry, a fish, a vegetable, a fruit or a dairy food.

6. The food product of claim 5, wherein the first dry crumb coating is sized such that it passes through a 1 mm mesh screen prior to being applied to the aqueous coating composition on the exterior surface of the substrate.

7. The food product of claim 6, wherein the first dry crumb comprises xanthan gum or a mixture of hydrocolloids including xanthan gum.

8. The food product of claim 6, wherein the first dry crumb has a particle size of about 0.25 mm to about 1 mm and the first dry crumb comprises a hydrocolloid.

9. The food product of claim 5 further comprising a first layer of outer crumb applied to a batter coating applied over the first dry crumb coating wherein the first layer of outer crumb employs crumbs having a particle size of 2 mm or larger and a second layer of outer crumb applied to the first layer of outer crumb wherein the second layer of outer crumb employs crumbs having a particle size of from about 0.2 to about 2 mm.

10. The food product of claim 9, wherein the modified starch in the coating composition is present in an amount of from 15 to 35% by dry weight.

11. The food product of claim 10, wherein the hydrocolloid is selected from the group consisting of xanthan gum, guar gum and mixtures thereof.

12. A food product comprising:
a substrate having an exterior surface wherein the substrate comprises a piece of meat, poultry, fish, vegetable, fruit or dairy food and wherein the substrate has been impregnated with a stabilizer composition and thereafter an aqueous coating composition that is different from the stabilizer composition is subsequently applied to the exterior surface of the substrate, a first dry crumb is applied to the aqueous coating composition to form a first dry crumb layer; and
wherein the aqueous coating composition comprises a mixture of ingredients, by dry weight, of:

| | |
|---|---|
| cellulose gum | 15-35% |
| modified starch | 15-50% |
| hydrocolloid | 20-30%. | wherein the hydrocolloid is selected from the group consisting of xanthan gum, carrageenan gum, guar gum and mixtures thereof, and

| | |
|---|---|
| proteinaceous component | 10-20%; | and wherein the percentages of the ingredients of the aqueous coating composition are selected from the ranges quoted to total 100%.

13. The food product of claim 12, wherein the aqueous coating composition is free of polydextrose.

14. The food product of claim 12, wherein the proteinaceous component is egg albumen.

15. The food product of claim 12, wherein the first dry crumb has a particle size such that the first dry crumb will pass through a 1 mm mesh sieve.

16. The food product of claim 12, wherein the first dry crumb passes through a 1 mm mesh screen; and
    a batter composition applied to the layer of first crumb.

17. The food product of claim 16, wherein the first dry crumb comprises xanthan gum or a mixture of hydrocolloids including xanthan gum.

18. The food product of claim 17, wherein the batter composition encases the substrate within the batter composition.

19. The food product of claim 12, wherein the aqueous coating composition is a thixotropic gel and free of polydextrose.

20. The food product of claim 16, wherein the first dry crumb comprises xanthan gum and wherein the food product further comprises a second dry crumb having a particle size greater than the first dry crumb wherein the second dry crumb is applied over the batter composition.

\* \* \* \* \*